Oct. 11, 1955  F. KOCH  2,720,261
LONG STROKE SLIDE FEED MECHANISM FOR ADVANCING AND
CUTTING OFF OR OTHERWISE OPERATING ON STOCK
IN PREDETERMINED, UNLIMITED LENGTHS
Filed Oct. 26, 1951  3 Sheets-Sheet 1
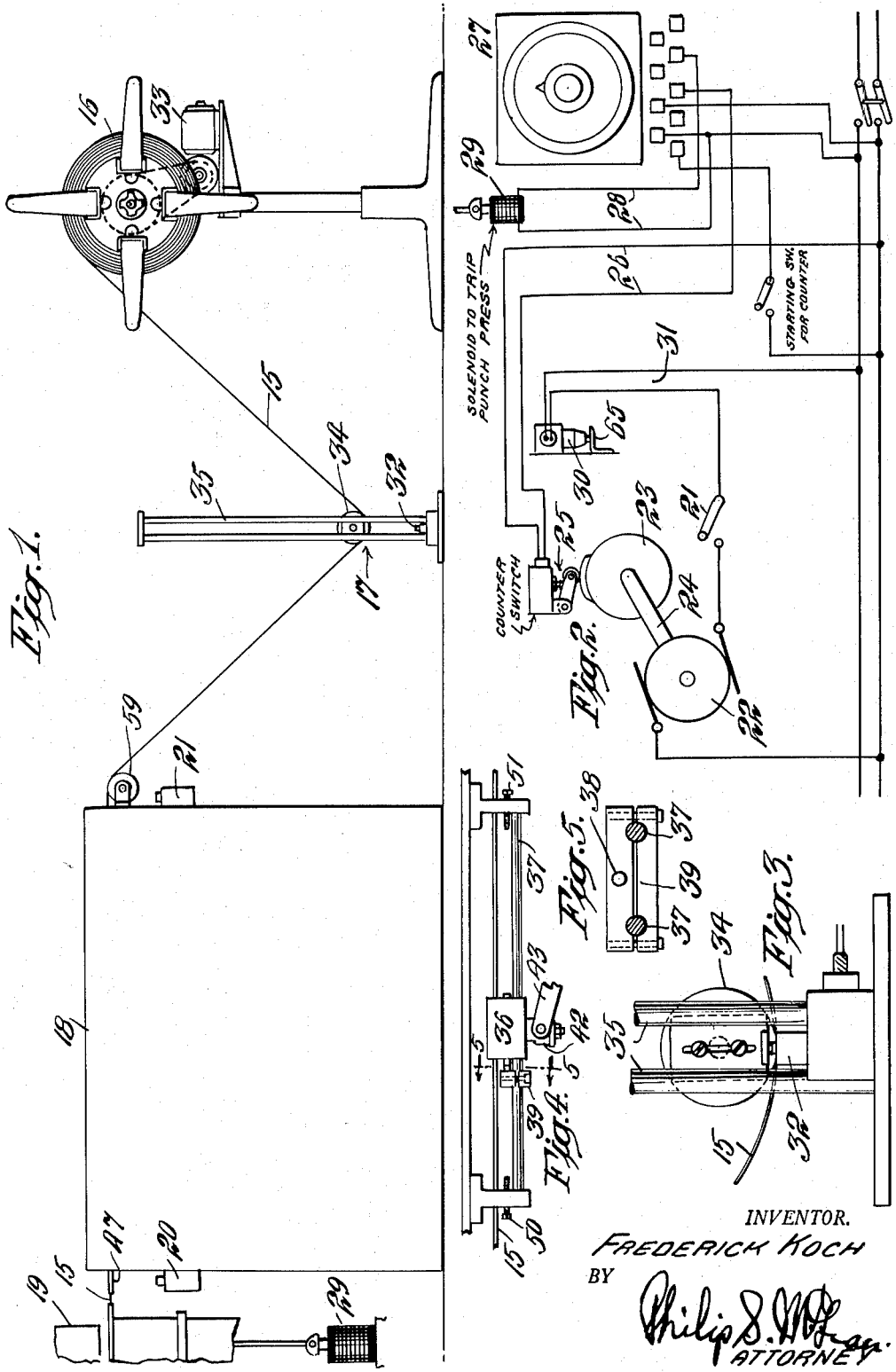
INVENTOR.
FREDERICK KOCH
BY
ATTORNEY

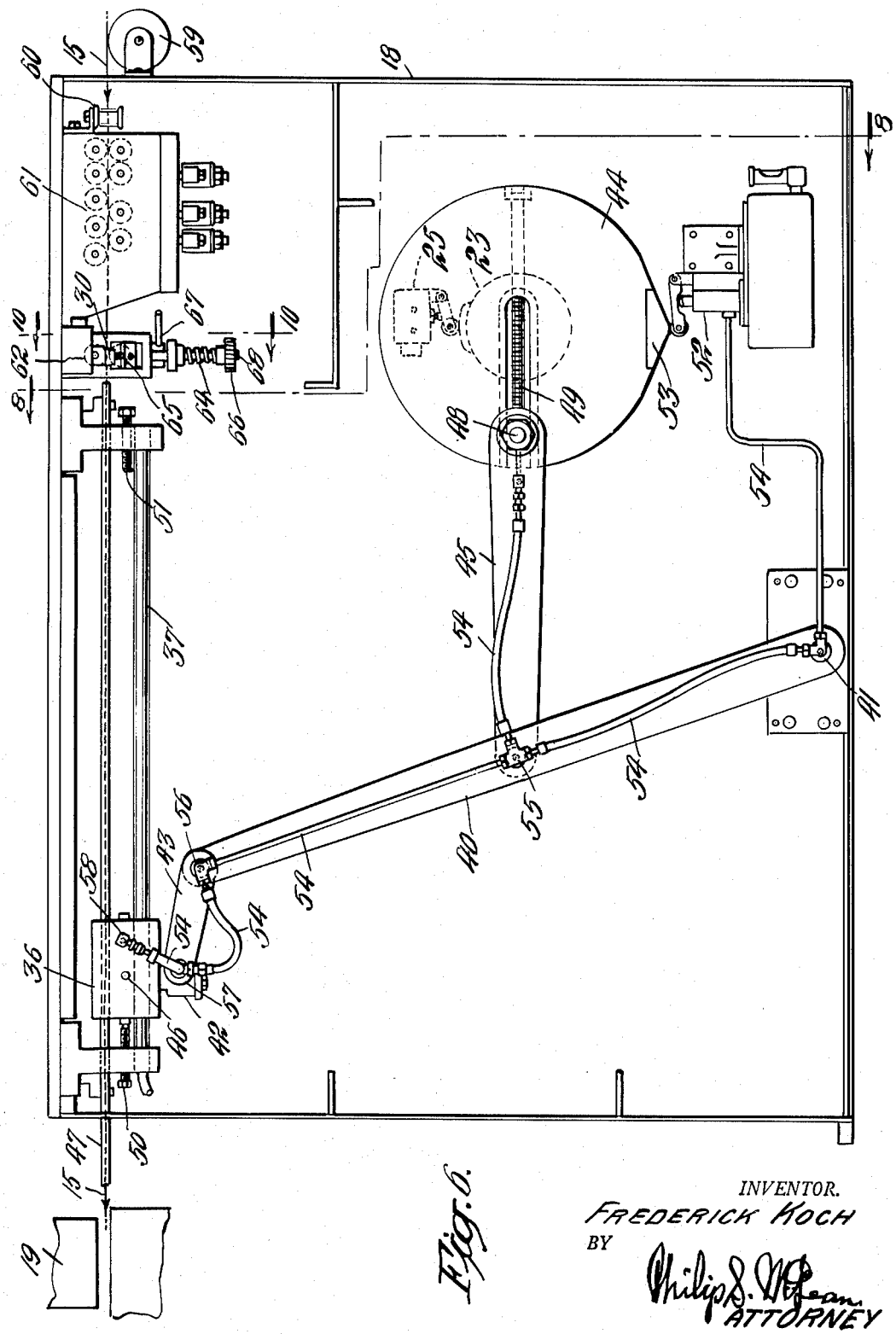

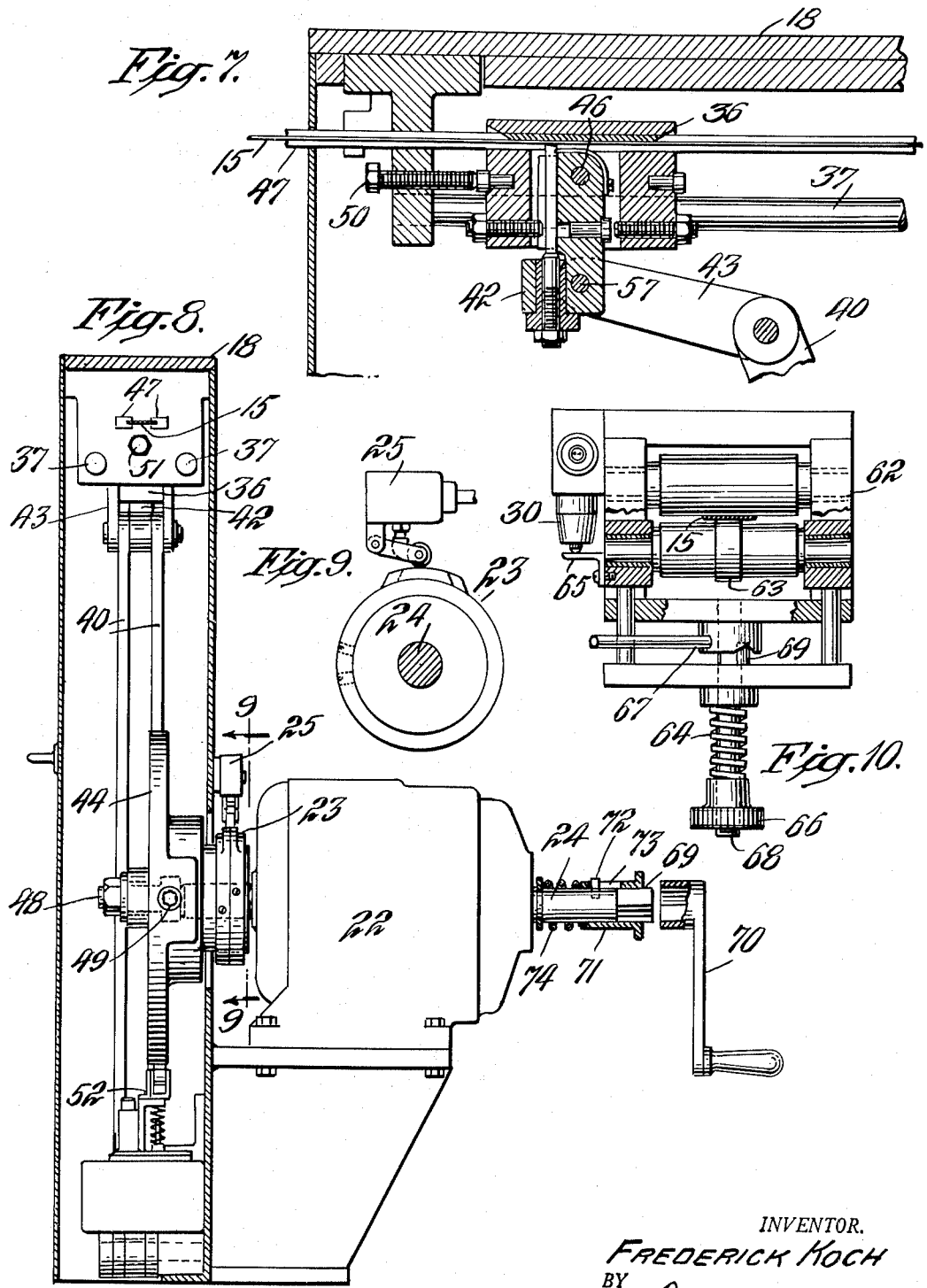

United States Patent Office 2,720,261
Patented Oct. 11, 1955

2,720,261

LONG STROKE SLIDE FEED MECHANISM FOR ADVANCING AND CUTTING OFF OR OTHERWISE OPERATING ON STOCK IN PREDETERMINED, UNLIMITED LENGTHS

Frederick Koch, Sparta, N. J., assignor to C. Todd, Rutherford, N. J., trustee

Application October 26, 1951, Serial No. 253,366

10 Claims. (Cl. 164—48)

The invention disclosed in this patent relates to slide feeds.

Feeds of this character, involving a reciprocating block carrying stock gripping means have, for mechanical reasons, been limited as regards the possible length of feed stroke.

The broad purposes of the invention are to provide a feed slide which can be made to feed any length of stock and to cut off or otherwise operate on the predetermined length of stock fed.

Special objects of the invention are to provide such mechanism in a practical form for commercial operations, at reasonable cost and adapted to be combined to best advantage with stock reels, power presses and other possible necessary cooperative equipment.

Further special objects of the invention are to provide a slide feed having a long feed stroke, regulatable for advancing what would be considered a long section of stock and which may be operated to deliver just that length of stock furnished on the one stroke, or be controlled to deliver a greater length constituting some multiple of that supplied by a single stroke.

Other desirable objects attained by the invention and the novel features of construction, combinations and relations of parts constituting the invention are further set forth and will appear in the course of the following specification.

The drawings accompanying and forming part of the specification are illustrative of a present practical embodiment of the invention, but structure and arrangement may be further modified and changed, all within the true intent and broad scope of the invention as hereinafter defined and claimed.

Figure 1 in the drawings is a broken side elevation of the new slide feed assembly showing the stock passing from the supply reel at one end, through the reel controller to the slide feed unit and from the later to the press or like mechanism for cutting off or otherwise operating on the predetermined length of stock advanced to it.

Figure 2 is a wiring diagram showing the timer for counting the number of strokes the slide feed is to operate, the solenoid for tripping the press and other details.

Figure 3 is an enlarged broken detail of the control switch for the stock supply reel.

Figure 4 is a broken side elevation showing the stock extending through the reciprocating feed block.

Figure 5 is an enlarged cross section showing the adjustable feed block stop as on substantially the plane of line 5—5 of Figure 4.

Figure 6 is an inside view of the slide feed unit, with the front cover wall removed.

Figure 7 is a broken sectional detail of the feed block and oscillating stock gripper.

Figure 8 is a vertical sectional view of the feed unit as on generally the plane of line 8—8 of Figure 6 and showing in broken section the hand crank for turning the motor to adjust and set up the machine.

Figure 9 is a broken sectional detail of the counter cam as on substantially the plane of line 9—9 of Figure 8.

Figure 10 is an enlarged broken sectional view of the roller check and run-out switch taken on substantially the plane of line 10—10 of Figure 6.

Figure 1 illustrates a typical embodiment of the invention in which strip stock 15 is supplied by a power reel 16, as required by controller 17 to the slide feed mechanism enclosed within unit 18 which advances the stock in a predetermined length to a punch, press or other such machine 19 timed to cut off or otherwise operate on such fixed length.

Starting and stopping switches are shown located at each end of the slide feed unit at 20, 21, enabling an operator to control the machine from a position at the press end or at the supply reel end.

Figure 2 illustrates in a general way the wiring lay-out showing a motor 22 having a cam 23 on the shaft 24 of the same for operating a counter switch 25 connected at 26 with a timer 27 controlling through connections 28, a solenoid 29 for tripping the press after a predetermined number of strokes of the slide feed. This wiring diagram also shows a run-out switch 30 connected with the motor circuit at 31.

The counter or timer may be of any suitable design, such as the "Microflex Instantaneous Reset Counter" made by Eagle Signal Corporation of Moline, Illinois, under Patents 1,794,762 of March 3, 1931; 2,175,864 and 2,175,865 of October 10, 1939, the general requisites being that it will count the strokes made by the slide feed, and can be set to close or open a control circuit after a predetermined number of strokes.

In the illustration the solenoid 29 is energized to trip the power press to cut off or operate on the strip after the slide feed has made enough strokes to advance a predetermined desired length of stock.

The cam 23 which actuates the counter switch is located so as to index the counter on the retractive or idle strokes of the slide feed, thus to enable the slide feed to be kept in operation and not be stopped or tripped for each cut-off or other operation of the press. The long stroke movement of the slide feed provides sufficient time to thus effect tripping of the machine on the retractive or idle stroke of the slide feed mechanism.

Figure 3 shows how control of the power reel is maintained through the medium of a switch 32 connected with the reel drive motor 33 and arranged to be actuated by the lowering of the roll 34 guided in a vertical stand 35 and riding in a slack loop of the stock.

Figure 4 illustrates in a general way the feed block 36 sliding on guide rods 37 and accurately positioned at the end of its feed stroke by the stop 38, Figure 5, carried by the two part clamp 39 adjustably secured on the guide rods.

A long feed stroke is attained by means of a relatively long lever 40, Figure 6, fulcrumed at its lower end in the base of the unit at 41 and connected at its upper end with the stock gripping rocker 42 by a pivoted link 43, the intermediate section of this long lever being connected with the crank disc 44 on the end of the motor shaft by a pivoted link 45.

Figure 7 shows how the rocker 42 pivoted on the feed block 36 at 46 serves to grip the stock on the outward stroke and to release the stock on the inward stroke of the actuating lever 40. This view also indicates how the flat strip stock is confined and guided for such feeding movements between the opposed channeled edge guide strips 47.

The length of feed stroke is governed in the illustration by adjustment of the crank pin 48, Figure 6, to which link 45 is pivotally connected, by means of diametrically extending adjusting screw 49 in the crank disc 44.

For full length or more nearly full length reciprocating movements of the feed block, the front and back stop screws 50, 51, Figures 6 and 7, may be employed; but for lesser movements, stops such as indicated at 38, Figures 4 and 5, may be clamped on the guide rods 37.

The long feed stroke necessitates ample lubrication of the parts. Accordingly it is preferred, as indicated in Figures 6 and 8, to provide an oil pump 52 actuated by a cam projection 53 on crank disc 44, connected by pressure lines 54 with pivot centers 41, 55, 56 for lever 40, crank pin 48, center 57 for link 43 and to block 36 at 58 for lubricating guide rods 37.

The slide feed unit may be equipped with a guide roll 59, Figures 1 and 6, for supporting and directing the stock from the slack loop in between the edge guiding rolls 60 into the straightener rolls 61.

Companion check rollers are indicated at 62 for gripping the stock and holding it against recession on retrograde movement of the feed block.

Figure 10 shows how the lower of these rollers, equipped with a stock engaging annular rim 63, may be yieldingly pressed toward the upper roller by spring 64 so that when stock runs out it will shift toward the top roller to operate, through medium of bracket 65, the runout or cut-off switch 30.

The force of roll tensioning spring 64 may be adjusted by screw 66, Figure 10, and this same view shows how the hand operable cam 67 pivoted on bolt 68 may through engagement with stud 69 be turned to back the lower roller away from the upper roller, or leave the lower roller spring pressed toward the companion roller.

To provide for slight forward and back movements of the slide feed in setting the machine up for operation, the motor shaft may be turned by a hand crank shown at 70, Figure 8, engageable over the angular outer end portion 69 of the motor shaft. This portion of the shaft is shown as having a sleeve 71 slidingly confined thereon by pin 72 on the shaft received in longitudinal slot 73 in the sleeve and pressed outward by spring 74 encircling the shaft, to force the crank off the end of the shaft, thus to require that the crank be positively held in place and to assure that the crank will be off the shaft when the motor is started.

The slide feed unit, preferably enclosed in the cabinet structure such as shown, may be made up as a complete unitary structure ready for use with a conventional one revolution punch press or other such machine and adapted to be supplied from a standard power reel. The long stroke effected by this particular slide feed enables it to feed stock for extra long length punching operations and where one feed stroke is not sufficient, to set the machine for plural feed stroke operation, so that the punch or other cooperating machine will not come into action until after the slide feed has made a predetermined number of feed strokes. Thus through proper adjustment of the timer and counter mechanism, the slide feed may continue and make any number of feed strokes and only then after a proper length of stock has been fed, the power press will come into action either to cut off that particular length of stock or to punch it, shape it or operate on it in some other way.

Thus, if desired, the machine may be utilized simply to advance a certain length of stock, say, to some kind of winding or coiling machine and then have that predetermined length of stock cut off; or for another example, the slide feed may continue to advance the stock and the stock be punched or otherwise operated upon only after a certain predetermined number of feeding operations have been completed.

Instead of tripping the press or other cooperating machine and causing it to act during the dwell or return movement of the slide block, it is possible that the stock gripping operation may be automatically interrupted on the completion of a certain number of feed strokes by trip mechanism similar to that disclosed in co-pending patent application, filed August 2, 1951, Serial No. 239,880, now Patent No. 2,624,575 of January 6, 1953.

Because of the long travel of the feed block on the guide rods 37, it is contemplated that these rods may be of tubular form and water or other cooling liquid be circulated through the same. Other changes may be made, all within the true intent of the invention as disclosed.

What is claimed is:

1. A long stroke slide feed comprising a feed block and a stock gripping lever mounted to oscillate thereon, means for guiding said feed block for straight line horizontal reciprocating movement, a long actuating lever pivotally connected with said stock gripping lever and fulcrumed at its lower end beneath said block, a motor driven crank, a link pivotally connecting said crank with an intermediate portion of said long lever, a motor driven cam actuated to operate in timed relation with said crank, a counter actuated by said cam at each oscillating feed stroke of said long lever, a machine adjoining said long stroke slide feed positioned and arranged for operating on the stock advanced by said slide feed, a controller for initiating operation of said machine and connections from said counter to said controller for effecting operation of said machine only after a predetermined number of actuations of said counter and a predetermined number of feed strokes have been made by said slide feed.

2. In combination, a machine for operating on strip stock, a reciprocating slide feed positioned and arranged to intermittently advance predetermined lengths of the strip stock to said machine, a counter for counting the feed strokes of said slide feed, means operating in timed relationship with the reciprocating movements of said slide feed and arranged to actuate said counter each time the slide feed is reciprocated and means connected with said counter and actuated thereby to effect operation of said machine after a predetermined number of actuations of said counter.

3. In combination, a machine for operating on strip stock, a reciprocating slide feed positioned and arranged to intermittently advance predetermined lengths of the strip stock to said machine, a counter for counting the feed strokes of said slide feed, means operating in timed relationship with the reciprocating movements of said slide feed and arranged to actuate said counter each time the slide feed is reciprocated, means connected with said counter and actuated thereby to effect operation of said machine after a predetermined number of actuations of said counter and including a machine controlling solenoid and electrical connections from said counter to said solenoid.

4. In combination, a machine for operating on strip stock, a reciprocating slide feed positioned and arranged to intermittently advance predetermined lengths of the strip stock to said machine, a counter for counting the feed strokes of said slide feed, means operating in timed relationship with the reciprocating movements of said slide feed and arranged to actuate said counter each time the slide feed is reciprocated and means connected with said counter and actuated thereby to effect operation of said machine after a predetermined number of actuations of said counter, said machine being a single revolution power press having means to trip the same into operation and said control means including a solenoid connected to actuate said means for tripping the press thereby to trip said power press and electrically connected with said counter and whereby said power press will be caused to effect a single operation at the end of a predetermined number of feed strokes by said slide feed.

5. In combination, a machine for operating on strip stock, a reciprocating slide feed positioned and arranged to intermittently advance predetermined lengths of the strip stock to said machine, a counter for counting the feed strokes of said slide feed, means operating in timed relationship with the reciprocating movements of said slide feed and arranged to actuate said counter each time the slide feed is reciprocated and means connected with said counter and actuated thereby to effect operation of said machine after a predetermined number of actuations of said counter, said machine being a single revolution power press having means to trip the same into operation and said control means including a solenoid connected to actuate said means for tripping the press thereby to trip said power press and electrically connected with said counter and whereby said power press will be caused to effect a single operation at the end of a predetermined number of feed strokes by said slide feed and said counter being timed to effect the tripping of the power press in the interval between the counted feed strokes and the succeeding series of counted feed strokes.

6. In combination, a reciprocating slide feed for intermittently advancing stock in continuous lengths, a power positioned for operating on the stock advanced by said slide feed, an electrical device for activating said power machine, means operated concurrently with the reciprocating movements of said slide feed and a counter operated by said means upon each reciprocation of the slide feed and connected to effect operation of said electrical device after a predetermined number of operations of the counter.

7. In combination, a reciprocating slide feed for intermittently advancing stock in continuous lengths, a power machine positioned for operating on the stock advanced by said slide feed, an electrical device for activating said power machine, means operated concurrently with the reciprocating movements of said slide feed, a counter operated by said means upon each reciprocation of the slide feed and connected to effect operation of said electrical device after a predetermined number of operations of the counter, a pair of yieldably cooperating gripping rolls for engaging the stock adjoining said slide feed and a run-out switch operable by the movement of said rolls toward each other in the absence of stock therebetween, a motor for operating the slide feed and control connections from said run-out switch to said motor.

8. Slide feed mechanism comprising a reciprocating feed block, a lever for reciprocating the same, a motor having a shaft, means on said shaft for actuating said lever, a cam on said shaft, a counter operated by said cam during each reciprocation of the feed block, mechanism for operating on the stock advanced by said feed block and a controller for said mechanism operated by said counter after a predetermined number of actuations of the counter by the cam.

9. Slide feed mechanism comprising a reciprocating feed block, a lever for reciprocating the same, a motor having a shaft, means on said shaft for actuating said lever, a cam on said shaft, a counter operated by said cam during each reciprocation of the feed block, mechanism for operating on the stock advanced by said feed block and a controller for said mechanism operated by said counter after a predetermined number of actuations of the counter by the cam, said motor having an extension and a hand crank engageable with said shaft extension for turning the motor over by hand for the preliminary setting up of the machine.

10. Slide feed mechanism comprising a reciprocating feed block, a lever for reciprocating the same, a motor having a shaft, means on said shaft for actuating said lever, a cam on said shaft, a counter operated by said cam during each reciprocation of the feed block, mechanism for operating on the stock advanced by said feed block, a controller for said mechanism operated by said counter after a predetermined number of actuations of the counter by the cam, said motor having an extension and a hand crank engageable with said shaft extension for turning the motor over by hand for the preliminary setting up of the machine and a spring actuated crank throw off on said shaft extension yieldable to permit forcible engagement of the crank over the shaft extension but arranged to force the crank off the shaft extension in the absence of applied force holding the crank in position on the shaft extension to prevent the crank being left on the shaft extension when the motor is energized to operate the machine.

References Cited in the file of this patent

UNITED STATES PATENTS

| | | |
|---|---|---|
| 475,931 | Chapin | May 31, 1892 |
| 1,959,922 | Maspons | May 22, 1934 |
| 2,172,502 | DeWitt | Sept. 12, 1939 |
| 2,250,530 | Hafecost | July 29, 1941 |
| 2,381,571 | Buchan | Aug. 7, 1945 |